US011038660B2

(12) United States Patent
Yi

(10) Patent No.: US 11,038,660 B2
(45) Date of Patent: *Jun. 15, 2021

(54) METHOD AND APPARATUS FOR CONFIGURING FRAME STRUCTURE AND FREQUENCY HOPPING FOR MTC UE IN WIRELESS COMMUNICATION SYSTEM

(71) Applicant: LG ELECTRONICS INC., Seoul (KR)

(72) Inventor: Yunjung Yi, Seoul (KR)

(73) Assignee: LG Electronics Inc., Seoul (KR)

(*) Notice: Subject to any disclaimer, the term of this patent is extended or adjusted under 35 U.S.C. 154(b) by 40 days.

This patent is subject to a terminal disclaimer.

(21) Appl. No.: 16/420,593

(22) Filed: May 23, 2019

(65) Prior Publication Data

US 2019/0288821 A1   Sep. 19, 2019

Related U.S. Application Data

(63) Continuation of application No. 15/554,960, filed as application No. PCT/KR2016/002265 on Mar. 7, 2016, now Pat. No. 10,396,965.

(Continued)

(51) Int. Cl.
*H04L 5/00* (2006.01)
*H04W 4/70* (2018.01)
(Continued)

(52) U.S. Cl.
CPC .......... *H04L 5/0064* (2013.01); *H04L 5/0037* (2013.01); *H04W 4/70* (2018.02);
(Continued)

(58) Field of Classification Search
None
See application file for complete search history.

(56) References Cited

U.S. PATENT DOCUMENTS

| 10,396,965 B2* | 8/2019 | Yi | H04W 72/0406 |
| 2009/0238241 A1 | 9/2009 | Hooli | H04B 1/7143 375/133 |

(Continued)

FOREIGN PATENT DOCUMENTS

| CN | 104365165 A | 2/2015 |
| WO | 13-073924 A1 | 5/2013 |
| WO | 14/110757 A1 | 7/2014 |

OTHER PUBLICATIONS

R-150286: 3GPP TSG RAN WG1 Meeting #80, Athens, Greece, Feb. 9-13, 2015, NEC, "Frequency hopping schemes for LTE Rel-13 MTC," pp. 1-4.

(Continued)

*Primary Examiner* — Lonnie V Sweet
(74) *Attorney, Agent, or Firm* — Dentons US LLP

(57) ABSTRACT

A method and apparatus for communicating with a machine-type communication (MTC) user equipment (UE) in a wireless communication system is provided. A base station (BS) configures a first MTC transmission time interval (M-TTI) for a first UE and a second M-TTI for a second UE in a subband, and communicates with the first UE and the second UE in the subband by using the first M-TTI and the second M-TTI. In this case, the first UE and the second UE have different coverage enhancement (CE) level from each other.

12 Claims, 25 Drawing Sheets

Related U.S. Application Data

(60) Provisional application No. 62/244,729, filed on Oct. 21, 2015, provisional application No. 62/232,420, filed on Sep. 24, 2015, provisional application No. 62/213,111, filed on Sep. 2, 2015, provisional application No. 62/210,943, filed on Aug. 27, 2015, provisional application No. 62/143,808, filed on Apr. 7, 2015, provisional application No. 62/141,254, filed on Mar. 31, 2015, provisional application No. 62/129,716, filed on Mar. 6, 2015.

(51) Int. Cl.
| | | |
|---|---|---|
| *H04W 76/27* | (2018.01) | |
| *H04W 72/04* | (2009.01) | |
| *H04W 76/14* | (2018.01) | |
| *H04W 88/02* | (2009.01) | |
| *H04W 88/08* | (2009.01) | |

(52) U.S. Cl.
CPC ..... *H04W 72/044* (2013.01); *H04W 72/0406* (2013.01); *H04W 72/0446* (2013.01); *H04W 76/27* (2018.02); *H04L 5/006* (2013.01); *H04L 5/0007* (2013.01); *H04W 76/14* (2018.02); *H04W 88/02* (2013.01); *H04W 88/08* (2013.01)

(56) References Cited

U.S. PATENT DOCUMENTS

| | | | |
|---|---|---|---|
| 2011/0286349 A1* | 11/2011 | Tee | H04W 72/0446 370/252 |
| 2013/0176995 A1 | 7/2013 | Park et al. | |
| 2013/0294399 A1 | 11/2013 | Lee | |
| 2013/0301552 A1 | 11/2013 | Xu et al. | |
| 2013/0322493 A1* | 12/2013 | Jersenius | H04B 1/713 375/133 |
| 2014/0098761 A1 | 4/2014 | Lee et al. | |
| 2014/0171073 A1 | 6/2014 | Kim et al. | |
| 2014/0301302 A1 | 10/2014 | Xu et al. | |
| 2015/0117233 A1* | 4/2015 | Wong | H04L 1/188 370/252 |
| 2015/0131579 A1 | 5/2015 | Li et al. | |
| 2015/0208415 A1* | 7/2015 | Xu | H04L 1/1822 370/329 |
| 2016/0029331 A1* | 1/2016 | Seo | H04L 27/2613 370/350 |
| 2016/0050687 A1* | 2/2016 | Chen | H04L 5/0091 370/329 |
| 2016/0183231 A1* | 6/2016 | Shi | H04W 72/0446 370/329 |
| 2016/0192333 A1 | 6/2016 | Wang et al. | |
| 2016/0227580 A1* | 8/2016 | Xiong | H04L 5/0007 |
| 2016/0242212 A1 | 8/2016 | Wong | H04W 4/70 |
| 2016/0345117 A1* | 11/2016 | Nguyen | H04W 72/048 |
| 2016/0353440 A1* | 12/2016 | Lee | H04W 72/0453 |
| 2017/0164335 A1* | 6/2017 | Yamamoto | H04L 5/0092 |

OTHER PUBLICATIONS

Huawei et al., 'Uplink control channel design for MTC UEs', R1-150061, 3GPP TSG RAN WG1 Meeting #80, Athens, Greece, Feb. 9-13, 2015, pp. 3-5.
Panasonic, Consideration on data channel and associated control channel for MTC, R1-144797, 3GPP TSG RAN WG1 Meeting #79, San Francisco, USA, Nov. 17-21, 2014, pp. 1-4.
Huawei et al., 'Control channel support for non-MTC UEs', R1-145100, 3GPP TSG RAN WG1 Meeting #79, San Francisco, USA, Nov. 17-21, 2014, pp. 1-2.
Huawei et al., "Data Channel Transmission for MTC UEs," R1-150040, 3GPP TSG RAN WG1 Meeting #80, Feb. 18, 2015, see pp. 2-3.
Panasonic, "MTC Timing Design," R1-150308, 3GPP TSG RAN WG1 Meeting #80, Feb. 18, 2015, See pp. 1-2.
LG Electronics, "Considerations on Coverage Enhancement for MTC," R1-144890, 3GPP TSG RAN WG1 Meeting #79, Nov. 8, 2014, see pp. 2-4.
Notice of Allowance of the U.S. Patent Office in U.S. Appl. No. 15/556,271, dated Apr. 6, 2020.
Office Action of the U.S. Patent Office in U.S. Appl. No. 15/556,271, dated Jul. 5, 2019.
Continuation of U.S. Pat. No. 10,396,965.

\* cited by examiner

METHOD AND APPARATUS FOR CONFIGURING FRAME STRUCTURE AND FREQUENCY HOPPING FOR MTC UE IN WIRELESS COMMUNICATION SYSTEM

CROSS-REFERENCE TO RELATED APPLICATIONS

This application is a continuation of U.S. application Ser. No. 15/554,960, filed on Aug. 31, 2017 now allowed, which is a 371 of International Application No. PCT/KR2016/002265, filed on Mar. 7, 2016, which claims the benefit of U.S. Provisional Applications No. 62/129,716, filed on Mar. 6, 2015, No. 62/141,254, filed on Mar. 31, 2015, No. 62/143,808, filed on Apr. 7, 2015, No. 62/210,943, filed on Aug. 27, 2015, No. 62/213,111, filed on Sep. 2, 2015, No. 62/232,420, filed on Sep. 24, 2015, and No. 62/244,729, filed on Oct. 21, 2015, all of which are incorporated by reference in their entirety herein.

BACKGROUND OF THE INVENTION

Field of the Invention

The present invention relates to wireless communications, and more particularly, to a method and apparatus for configuring a frame structure and/or frequency hopping for a machine-type communication (MTC) user equipment (UE) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Some MTC UEs may be installed in the basements of residential buildings or locations shielded by foil-backed insulation, metalized windows or traditional thick-walled building construction. These MTC UEs may experience significantly greater penetration losses on the radio interface than normal LTE UEs. Thus, for these MTC UEs, coverage enhancement may be required. The MTC UEs in the extreme coverage scenario may have characteristics such as very low data rate, greater delay tolerance, and no mobility, and therefore, some messages/channels may not be required.

For efficient MTC transmission method, a new frame structure for MTC transmission has been discussed lately. Further, various enhancements of MTC transmission method based on the new frame structure for MTC have also been considered.

SUMMARY OF THE INVENTION

The present invention provides a method and apparatus for configuring a frame structure and/or frequency hopping for a machine-type communication (MTC) user equipment (UE) in a wireless communication system. The present invention provides a transmission structure to transmit broadcast and unicast while frequency hopping and half-duplex frequency division duplex (FDD) (or time division duplex (TDD)) are assumed. The present invention provides a frequency hopping mechanism to minimize effects of frequency retuning latency. The present invention provides subband sharing between UEs with different coverage enhancement (CE) level. In an aspect, a method for communicating, by a base station (BS), with a machine-type communication (MTC) user equipment (UE) in a wireless communication system is provided. The method includes configuring a first MTC transmission time interval (M-TTI) for a first UE and a second M-TTI for a second UE in a subband, and communicating with the first UE and the second UE in the subband by using the first M-TTI and the second M-TTI. The first UE and the second UE have different coverage enhancement (CE) level from each other.

In another aspect, a base station (BS) includes a memory, a transceiver, and a processor coupled to the memory and the transceiver. The processor is configured to configure a first machine-type communication (MTC) transmission time interval (M-TTI) for a first user equipment (UE) and a second M-TTI for a second UE in a subband, and control the transceiver to communicate with the first UE and the second UE in the subband by using the first M-TTI and the second M-TTI. The first UE and the second UE have different coverage enhancement (CE) level from each other.

An efficient frame structure and/or frequency hopping mechanism can be provided for MTC transmission.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
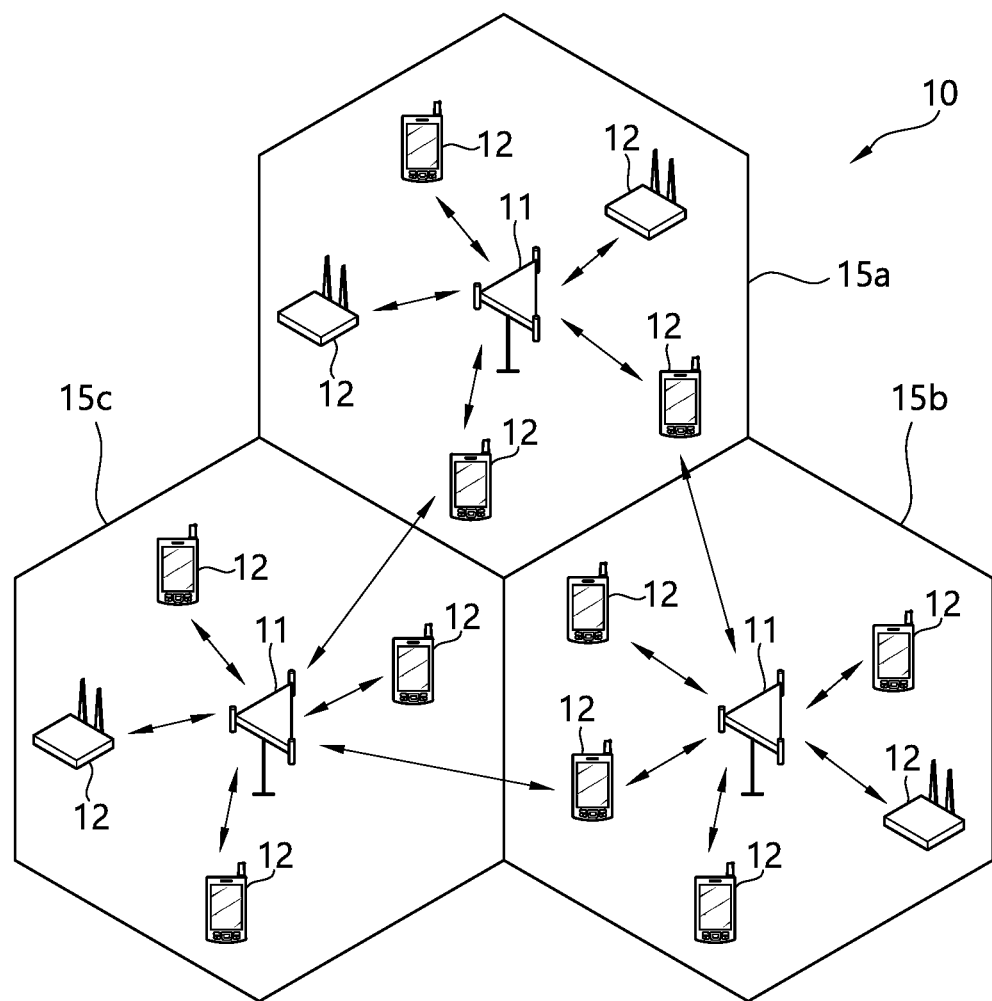
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc. In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
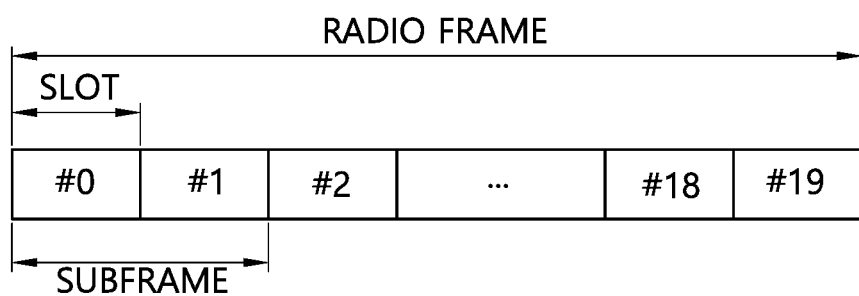
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
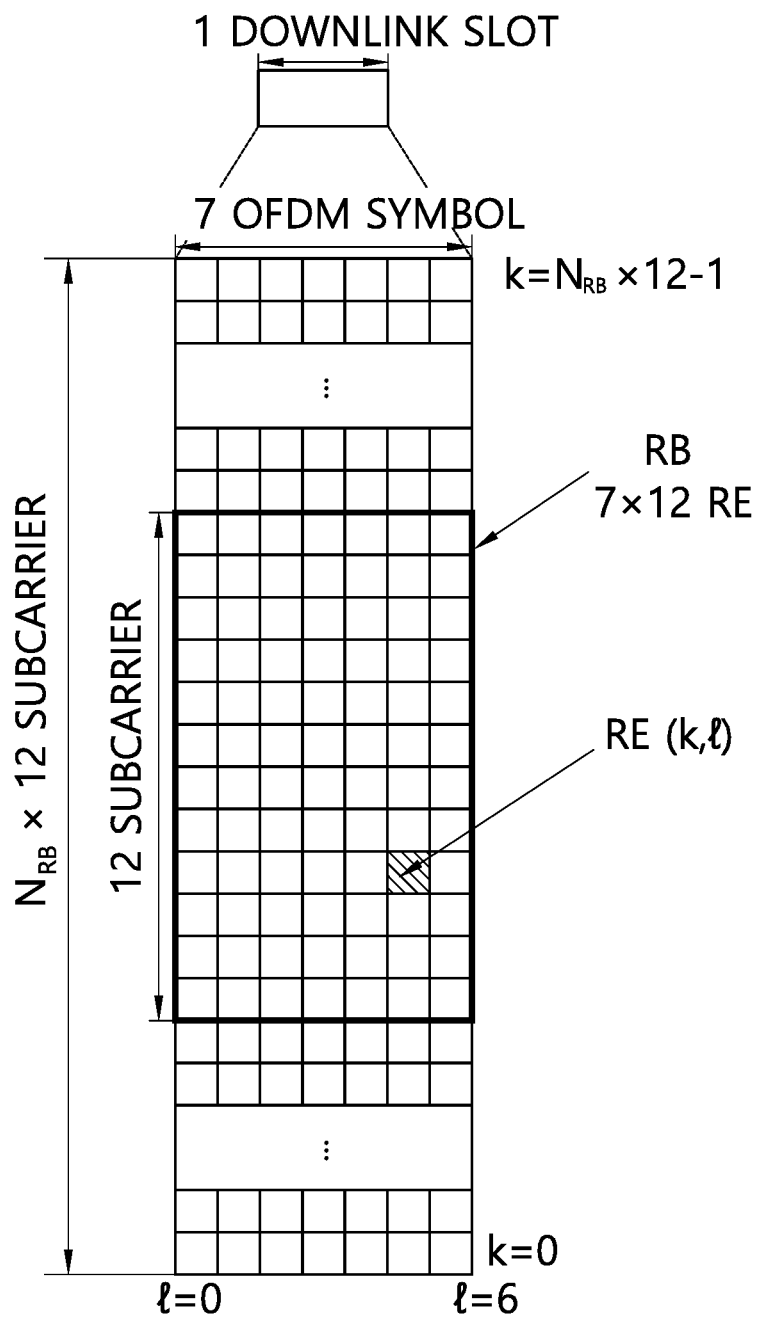
FIG. 3 shows a resource grid for one downlink slot.

Referring to FIG. 3, a DL slot includes a plurality of OFDM symbols FIG. 3 shows a resource grid for one downlink slot.in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
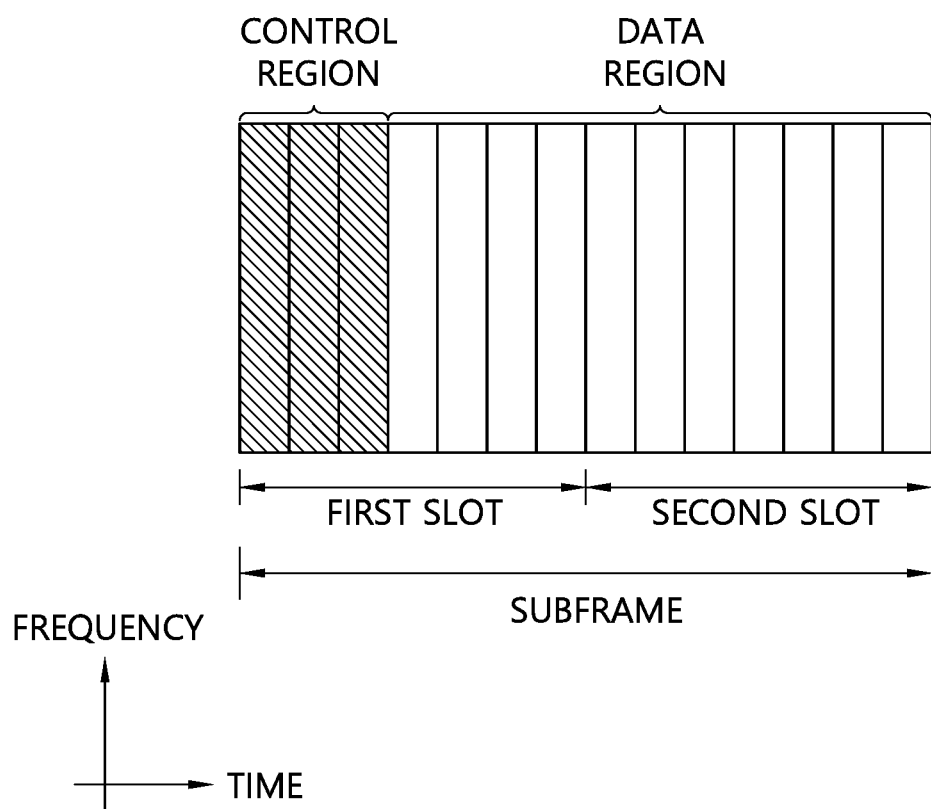
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
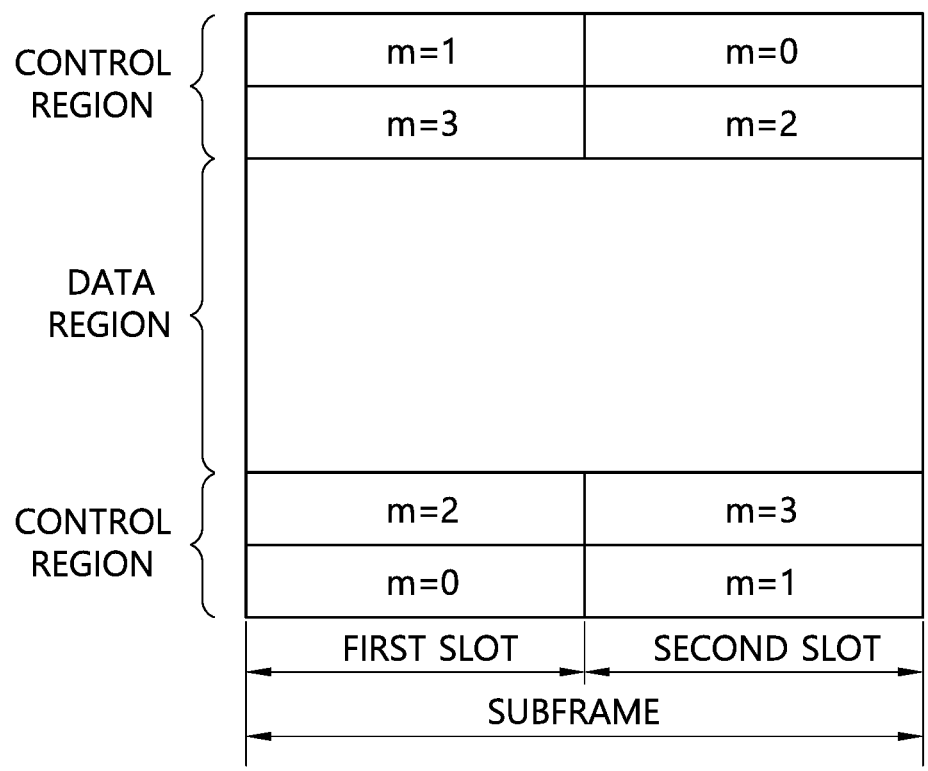
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In the current LTE specification, all UEs shall support maximum 20 MHz system bandwidth, which requires baseband processing capability to support 20 MHz bandwidth. To reduce hardware cost and battery power of the UE used for machine type communication (MTC), reducing bandwidth is a very attractive option. To enable narrow-band MTC UEs, the current LTE specification shall be changed to allow narrow-band UE category. If the serving cell has small system bandwidth (smaller than or equal to bandwidth that narrow-band UE can support), the UE can attach based on the current LTE specification. Hereinafter, a MTC UE may be referred to as one of a UE requiring coverage enhancement (CE), a low cost UE, a low end UE, a low complexity UE, a narrow(er) band UE, a small(er) band UE, or a new category UE. Or, just a UE may refer one of UEs described above.

In the description below, a case where system bandwidth of available cells is larger than bandwidth that new category narrow-band UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

Hereinafter, a method for configuring a frame structure to transmit broadcast and/or unicast data according to an embodiment of the present invention is described.

If a system bandwidth is larger than 1.4 MHz, it is likely that more than one subband may be configured. A subband may refer to a resource allocation unit for MTC UE which may use a narrow bandwidth. A subband may be a part of a system bandwidth. Hereinafter, let's assume that there are M subbands configured for a system bandwidth. Since a UE cannot receive broadcast+unicast or broadcast+broadcast or unicast+unicast simultaneously, and also, a UE may require one slot or one subframe to perform frequency retuning if subband changes, careful considerations on multiplexing should be considered.

Among M subbands configuring the system bandwidth, it may be simply assumed that there is one subband carrying physical broadcast channel (PBCH), and another subband carrying system information block 1 for MTC (hereinafter MTC-SIB1), and another subband carrying system information block 2 for MTC (hereinafter MTC-SIB2), and so on. Each subband may be the same. Or, each subband may be configured by previous channel. For example, PBCH may configure a subband for MTC-SIB1, and MTC-SIB1 may configure a subband for MTC-SIB2. Regardless of subband, a cell-specific subband hopping pattern may be configured. For example, for subband i, it may jump to the location of subband j where j=fk (system frame number (SFN), cell ID). Here, k is the index of hopping pattern. This example shows that hopping occurs in every radio frame. However, the hopping may occur in multiple subframes rather than a radio frame unit.

For primary synchronization signal (PSS)/secondary synchronization signal (SSS)/PBCH reading, the UE may stay in the center 6 PRBs. Subband/frequency hopping may be disabled for PSS/SSS/PBCH. In other words, the center 6 PRBs may always be used to transmit PSS/SSS/PBCH.

For paging reading, if a UE is in RRC_CONNECTED mode, a UE may assume that paging occurs in a subband where the UE is configured to monitor unicast data and/or control signal. If a UE is in RRC_IDLE mode, a UE may assume that the paging subband is configured or indicated by the network based on UE ID or some other means. While a UE is reading paging, it may not be required to receive any other data/control signal until receiving paging message is completed.

For MTC-SIB1 reading, if the MTC-SIB1 is read since MTC-SIB1 update, a UE may not be required to receive any other data/control signal until the MTC-SIB1 reading is completed. If the MTC-SIB1 is read based on UE autonomous behavior (e.g. update SIB due to timer expiration, etc.), the UE may also read other unicast data. If there is on-going unicast transmission, the UE may not be required to receive SIB(s) simultaneously.

For other SIB(s), if a UE reads SIB(s) because of SIB(s) update, a UE may not be required to receive any unicast data until updating SIB(s) is completed.

Figure 6:
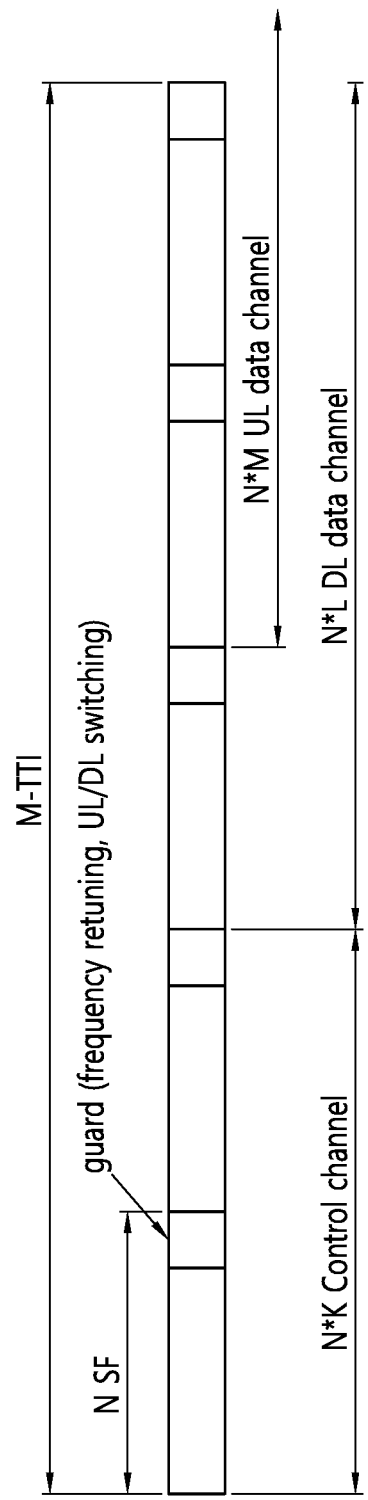
FIG. 6 shows an example of a frame structure for MTC according to an embodiment of the present invention.

FIG. 6 shows an example of a frame structure for MTC according to an embodiment of the present invention. Referring to FIG. 6, MTC-TTI (M-TTI) may be configured. M-TTI may refer to a time unit for transmitting data to MTC UEs. M-TTI may be longer than a conventional TTI described in FIG. 2 above. M-TTI may include multiple N subframes. In each N subframes, (N−1) subframes may be used for transmitting data to MTC UEs and channel estimation, and the remaining 1 subframe may be used as a guard period, which allows frequency retuning, UL/DL switching, etc. Frequency retuning gap may not be necessary if frequency retuning latency is small. In the M-TTI, N*K subframes may be used for control channel, and N*L subframes may be used for DL data channel. Further, N*M subframes may be used for UL data channel.

Figure 7:
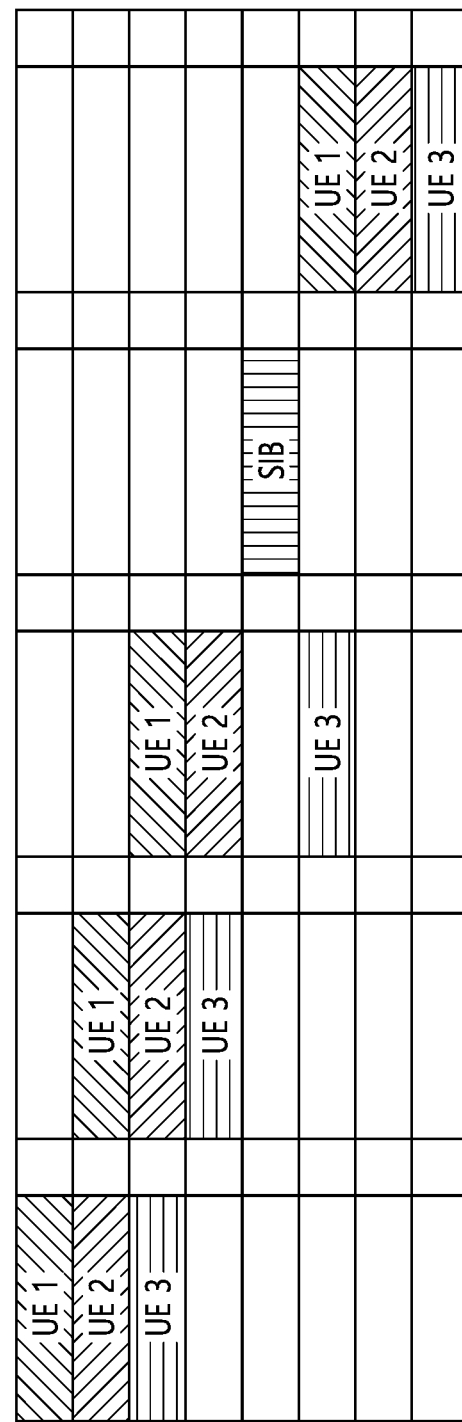
FIG. 7 shows an example of a frequency hopping and UE subband monitoring pattern according to an embodiment of the present invention.

FIG. 7 shows an example of a frequency hopping and UE subband monitoring pattern according to an embodiment of the present invention. To maximize frequency diversity with multi-subframes channel estimation, frequency hopping or switching of subband may occur in every N subframes. Referring to FIG. 7, in every N subframes, the location of subband for each UE changes. Further, to avoid potential collision between unicast data and/or control signal with broadcast data, one subband may be reserved for broadcast data which may not be used for frequency hopping. Referring to FIG. 7, SIB is transmitted in a subband without frequency hopping. Alternatively, frequency hopping of the subband where SIB is carried may be allowed as well.

For the simplicity, a UE may not perform frequency hopping across the system bandwidth within N subframes. The N subframes may be called as frequency hopping subframe group (FH-SFG). Referring to FIG. 7, frequency hopping occurs in every N subframes, but does not occur within each N subframe. Thus, if a UE needs to read broadcast data in different subbands where broadcast data transmission occurs in less than N subframes, the UE may not read unicast data during that N subframes regardless of whether the subframes carry broadcast data. Alternatively, a UE may also read unicast data in a subframe where broadcast data is not transmitted. Moreover, UL/DL switching may not occur within FH-SFG. This may be applied for TDD. In TDD, if a UE is in DL mode, UL subframes may not be utilized in a FH-SFG. And if a UE is in UL mode, DL subframes may not be utilized/monitored within a FH-SFG. If the network wants to utilize all DL/UL subframes, the network may configure N=2, which means that subband/frequency hopping may occur in multiples of FH-SFG rather than in every FH-SFG. More generally, the hopping pattern and/or hopping interval may be configured by the network via master information block (MIB), SIB, or higher layer signaling.

N may be determined as the minimum number or a unit of multi-subframes channel estimation. Separate N may be configured for DL and UL respectively. A UE may assume that multi-subframes channel estimation over N−1 subframes are feasible by maintaining the same subband location and same precoder (if any) over N−1 subframes. Without loss of generality, N−1 (reflecting frequency retuning delay) may be changed to N if retuning gap subframe is not needed.

For determining K (the number of N subframes for control channel), L (the number of N subframes for DL data channel), and M (the number of N subframes for UL data channel), which are described in FIG. 6 above, at least one of the following approaches may be considered.

(1) (N−1)*K may be the maximum number of repetition in subframes to carry one DCI given a CE level configured to a UE. In other words, only one DCI may be carried in N*K subframes. N and/or K may be different per CE level. For the simplicity, CE level may be different per subband such that the same K may be used in a subband (i.e. a UE with the same CE level is configured to the same subband). In this case, (N−1)*L may be the maximum number of repetition in subframes to carry one PDSCH given a CE level. If this approach is used, it is likely that only one UE may be scheduled in one M-TTI. Thus, it may increase the overall latency to be able to receive data for a given UE.

(2) (N−1)*K subframes may carry more than one DCI given a CE level configured to a subband. That is, in one M-TTI, multiple control channels may be carried. For DL data, (N−1)*L subframes may be configured such that it may carry only one PDSCH or multiple PDSCHs. N*K may be the maximum number of repetition in subframes assuming the smallest aggregation level (AL) that a UE monitors for a given CE level. For example, if the smallest AL=1 (this may require 2 PRBs per subframe), it may require 20 repetitions, so (N−1)*K may be 20. In this case, at least three DCIs with AL=1 may be multiplexed assuming 6 PRBs per subframe. More generally, if a UE monitors "m" ALs where each AL level i requires total required resource (TRR) TRR (i), (N−1)*K*6 may be defined as TRR(l)*p or TRR(m)*p where p is the number of DCIs per M-TTI.

A UE may monitor multiple ALs and/or multiple repetition numbers. For each approach described above, regardless of which approach is used, a UE may monitor only one DCI in one M-TTI. If a UE detects one DCI, it may stop monitoring on DCI in the same M-TTI. In this case, ULU grant and DL grant may not be delivered simultaneously within one M-TTI. Alternatively, a UE may monitor at most one DL scheduling DCI and at most one UL grant in one M-TTI. In this case, the UE may assume that it came in the same set of subframes. Thus, if a UE detects one DCI, it may not monitor other subframes any further. Each approach may be expanded over multiple times. Alternatively, starting and end subframe of DCI repetition may vary within MTC-DCI (M-DCI) region.

Figure 8:
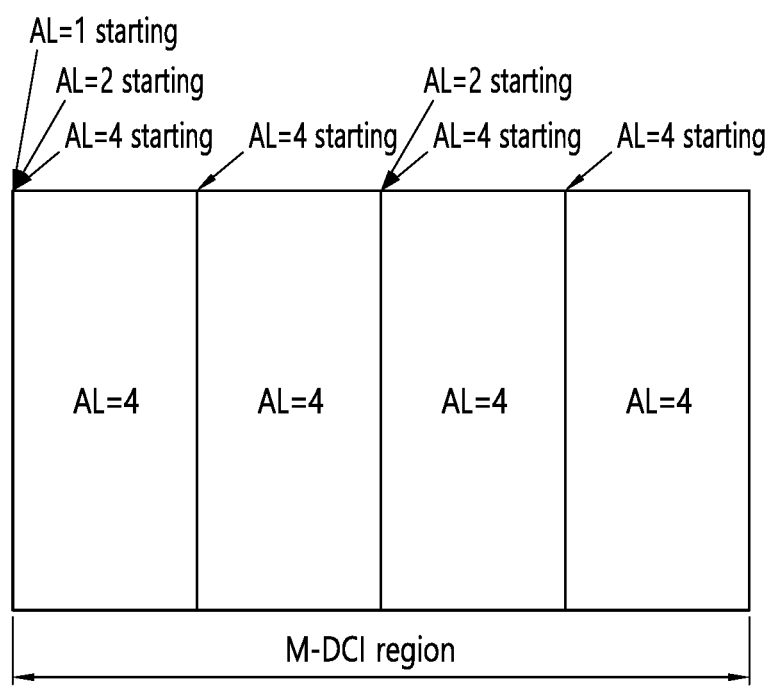
FIG. 8 shows an example of DCI transmission with different ALs within one M-TTI according to an embodiment of the present invention.

FIG. 8 shows an example of DCI transmission with different ALs within one M-TTI according to an embodiment of the present invention. FIG. 8 corresponds to a case that the same repetition (resource) level is kept across M-DCI region.

Figure 9:
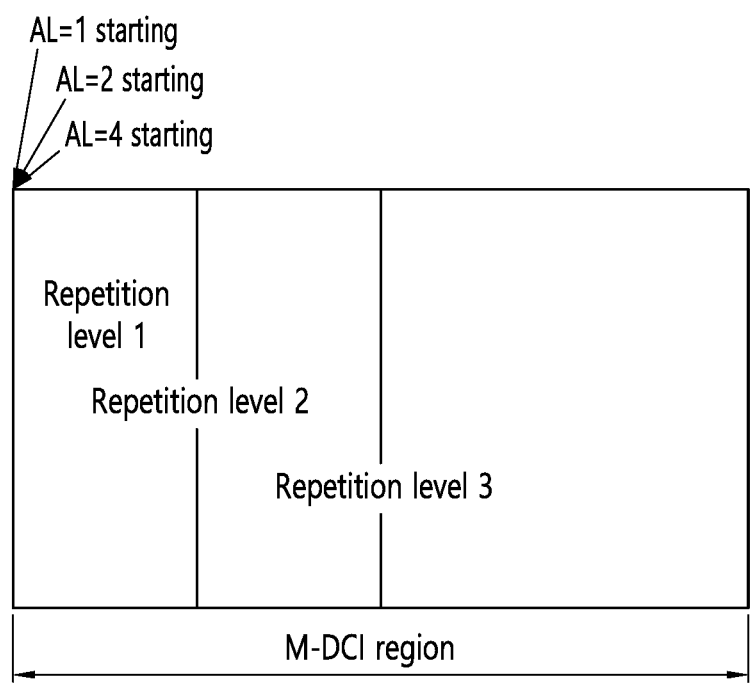
FIG. 9 shows another example of DCI transmission with different ALs within one M-TTI according to an embodiment of the present invention.

FIG. 9 shows another example of DCI transmission with different ALs within one M-TTI according to an embodiment of the present invention. FIG. 9 corresponds to a case that the repetition level changes across M-DCI region.

Figure 10:
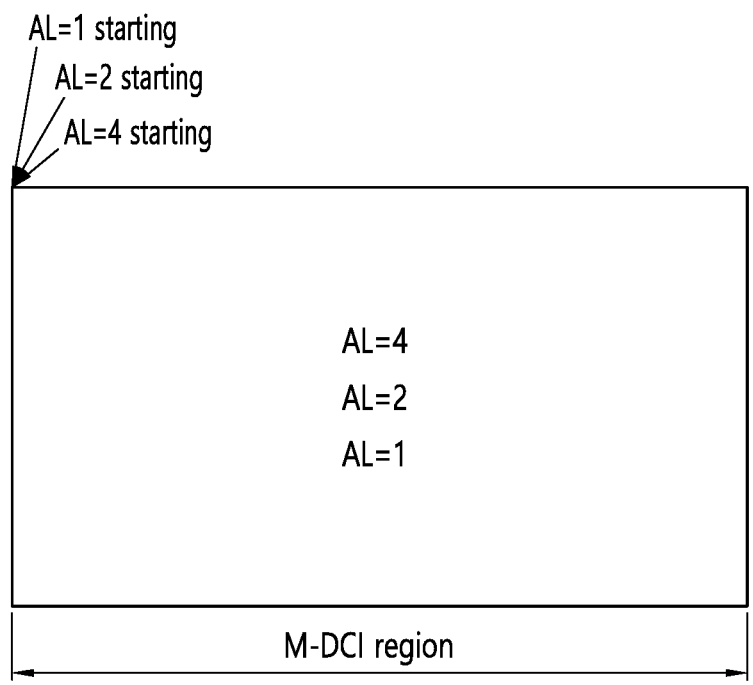
FIG. 10 shows another example of DCI transmission with different ALs within one M-TTI according to an embodiment of the present invention.

FIG. 10 shows another example of DCI transmission with different ALs within one M-TTI according to an embodiment of the present invention. FIG. 10 corresponds to a case that the repetition subframe is constant.

If one M-TTI includes multiple PDSCHs (for different UEs), the timing between control channel and PDSCH needs to be determined. For this, at least one of the following approaches may be considered.

(1) Implicit association: starting subframe and/or end subframe within M-DCI region may determine the starting subframe of PDSCH. For example, one M-TTI may include maximum two PDSCHs, the candidate starting subframe for two PDSCHs may be represented as Starting_SF_PDSCH1 and Starting_SF_PDSCH2 respectively. When a UE is scheduled with a DCI which ends earlier than the end of M-DCI region, the UE may assume that Starting_SF_PDSCH1 is the starting subframe of the scheduled PDSCH. Otherwise, the UE may assume that Starting_SF_PDSCH2 is the starting subframe of the scheduled PDSCH. (E)CCE or resource index used for control channel may also be used to implicitly refer the starting subframe for PDSCH.

(2) When creating CRC, starting subframe of PDSCH may be embedded. For example, if four possible starting positions for PDSCHs are available, one value from {0, 1, 2, 3} may be added to CRC. When a UE decodes control channel, the UE may also blindly detects the starting position of PDSCH.

(3) Explicit indication from DCI (4) Semi-static configuration to a UE (5) Semi-static configuration to a UE+implicit from DCI and/or SFN and/or starting subframe index: for example, an offset to each UE may be configured, and the starting subframe for PDSCH may be determined implicitly from the control channel and/or SFN value and/or starting subframe index and/or (E)CCE or resource index used for control channel.

For handling of multiple PDSCHs, multiple HARQ processes may be considered. If a UE supports multiple HARQ processes, depending on the data rate that the UE may want to achieve and the network may want to support, possible number of concurrent HARQ processes may change. To support this, a UE may signal its capability on the number of HARQ processes it may support, if it is allowed as a capability to support multiple HARQ processes. The network may also indicate the number of HARQ processes that the network supports via MIB, SIB, random access response (RAR) or higher layer signaling. When more than one HARQ processes (e.g. "p" processes) are supported, the M-TTI may be determined such that it may accommodate more than "p" PDSCHs which may be scheduled simultaneously. In this case, to minimize the control channel overhead, DL scheduling DCI may include a bitmap of HARQ processes which will be scheduled. In other words, one DCI may be shared among multiple PDSCHs with different HARQ-process-ID assuming that resource allocation, modulation and coding scheme (MCS), and transport block size (TBS) are the same across different HARQ processes. If this is used, a separate new data indicator (NDI) per each HARQ process may be needed.

For subframe architecture for control signal/unicast data/broadcast data, one of the following options may be considered.

(1) Time division multiplexing (TDM) between different types of channel (no subframe is able to carry more than one channel type)

(2) Frequency division multiplexing (FDM) between unicast data and broadcast data+TDM between control signal and data (3) FDM between different types of channel (4) eNB scheduling based control Regardless of which option is used, if a UE is configured with a subband which is also used for transmitting broadcast data such as SIB, paging, the UE may assume that control signal/unicast data will not be scheduled in a subframe which is allocated for potential transmission of broadcast channel (e.g. SIB occasion or paging occasion). This assumption may be applied regardless of UE detection on broadcast channel or not.

Also, multicast broadcast single frequency network (MBSFN) subframes may not be used for transmitting unicast data as well. To cover various cases where possibly some subframes may not be used for unicast data repetition, a set of subframes used for unicast data may be configured per each subband. However, regarding MBSFN, MBSFN subframe(s) may be also used for unicast data repetition. In this case, additional signaling on which subframe(s) out of MBSFN subframe(s) may be used for unicast data transmission if necessary. If this additional signaling is not provided, the UE may assume that MBSFN subframes may not be used for unicast data transmission/repetition. Moreover, it is also possible that MBSFN subframe for MTC UE is different from that for legacy UEs. Also, since MBMS service may not be continuously transmitted, the repetition may occur in some cases and may not occur in some other cases. To support this, whether the unicast data is scheduled in MBSFN subframe or not may be signaled by DCI. If DCI indicates that unicast data may be scheduled in MBSFN subframe, a UE may assume that repetition occurs over MBSFN subframes. Otherwise, the UE may assume that MBSFN subframes may be skipped for unicast data repetition.

If a MTC UE is configured with a set of valid DL subframes, the reference signal (RS) pattern may be the same regardless of whether the subframe is MBSFN subframe or not. Another approach is to read MBSFN configuration and MBSFN subframe which is valid may be assumed to carry only demodulation RS (DM-RS) (no presence of legacy cell-specific RS (CRS)). If MBSFN SF configuration is not available, the same RS pattern which may be further indicated to MTC UEs what is the common RS pattern may be assumed. RS may be one of the followings.

(1) DM-RS for MTC UEs control signal and/or data
(2) Legacy CRS which may also be used for MTC UEs
(3) Legacy CRS which may be assumed as zero-power CRS such that data may be rate matched around them Common RS pattern may be
Only (1) is used
(1)+(2) are used
(1)+(3) are used
Only (2) are used What type of pattern is used may be higher layer signaled or broadcast via MIB/SIB.

Also, it is possible that a MTC UE is not aware of any MBSFN configuration nor MBMS configuration. In this case, the starting OFDM symbol for a MTC UE with narrow bandwidth may be fixed regardless of MBSFN subframe or not. In other words, the same starting OFDM symbol may be used regardless of subframe type. In this case, a UE may also assume that CRS will be present in subframes which are configured to monitor. By SIB and/or MIB, the set of subframes usable for MTC UEs may be configured separately or independently from MBSFN configuration. Thus, there may be skipped subframes which will not be used for transmission to MTC UEs. The different sets of subframes may be configured for a MTC UE in normal coverage and in coverage enhancement modes. Furthermore, separate sets of subframes may also be configured per each CE level or per subband region.

Figure 11:
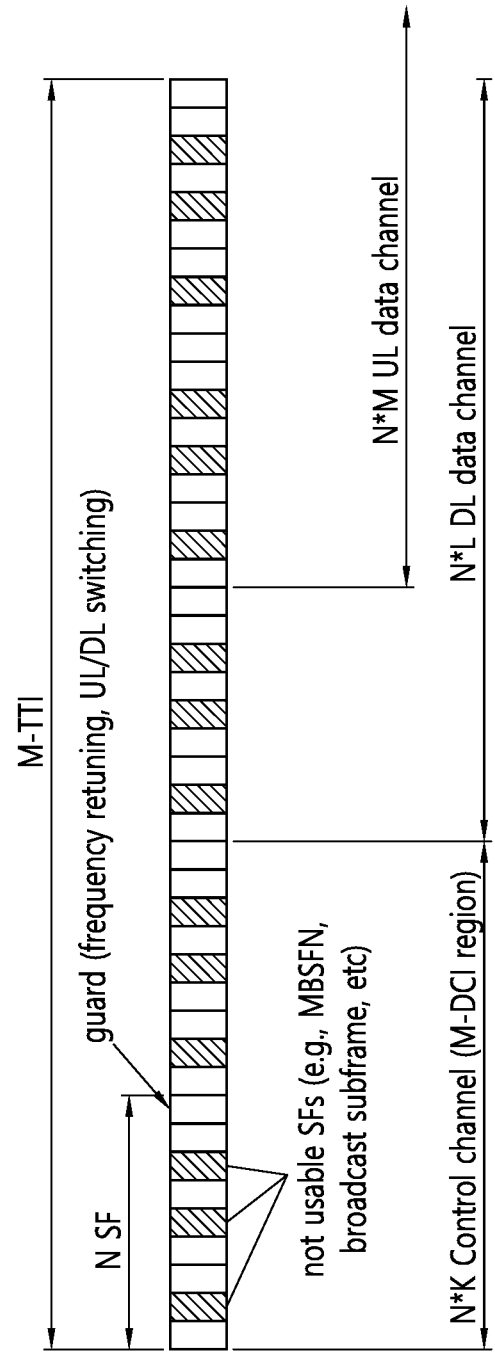
FIG. 11 shows another example of a frame structure for a MTC according to an embodiment of the present invention.

FIG. 11 shows another example of a frame structure for a MTC according to an embodiment of the present invention. Referring to FIG. 11, skipped subframes which will not be used for MTC transmission are considered. In each N subframes, there is a first set of subframes which can be used for MTC transmission and a second set of subframes which cannot be used for MTC transmission. Depending on the number of subframes not usable for repetition, a length of M-TTI may change even in the same subband.

Hereinafter, a method for handling a starting subframe in a frame structure for MTC according to an embodiment of the present invention is described. Along with handling a starting subframe in a frame structure for MTC, period configuration and/or 1024 radio frames wrap-around issue will be discussed. In terms of control channel monitoring period, it may be beneficial to implicitly derive the starting subframes of control channel monitoring. Since there may be a number of invalid subframes in L subframes (e.g. L=40), some restrictions on how to implicitly derive starting subframes of control channel monitoring needs to be clarified. In the description below, the repetition number for a control channel may be 1, 2, 4 . . . $2^q$ where $2^q$ is the maximum repetition number of control channel. For deriving the starting subframe and determining period of control channel, at least one of the following options may be considered.

(1) L may be sufficiently large to cover the number of valid subframes within L subframe. That is, L subframes may cover $2^q$ subframes in any case. In this case, starting subframe of each repetition level may be determined within L subframes (and may be repeated across L subframes).

Figure 12:
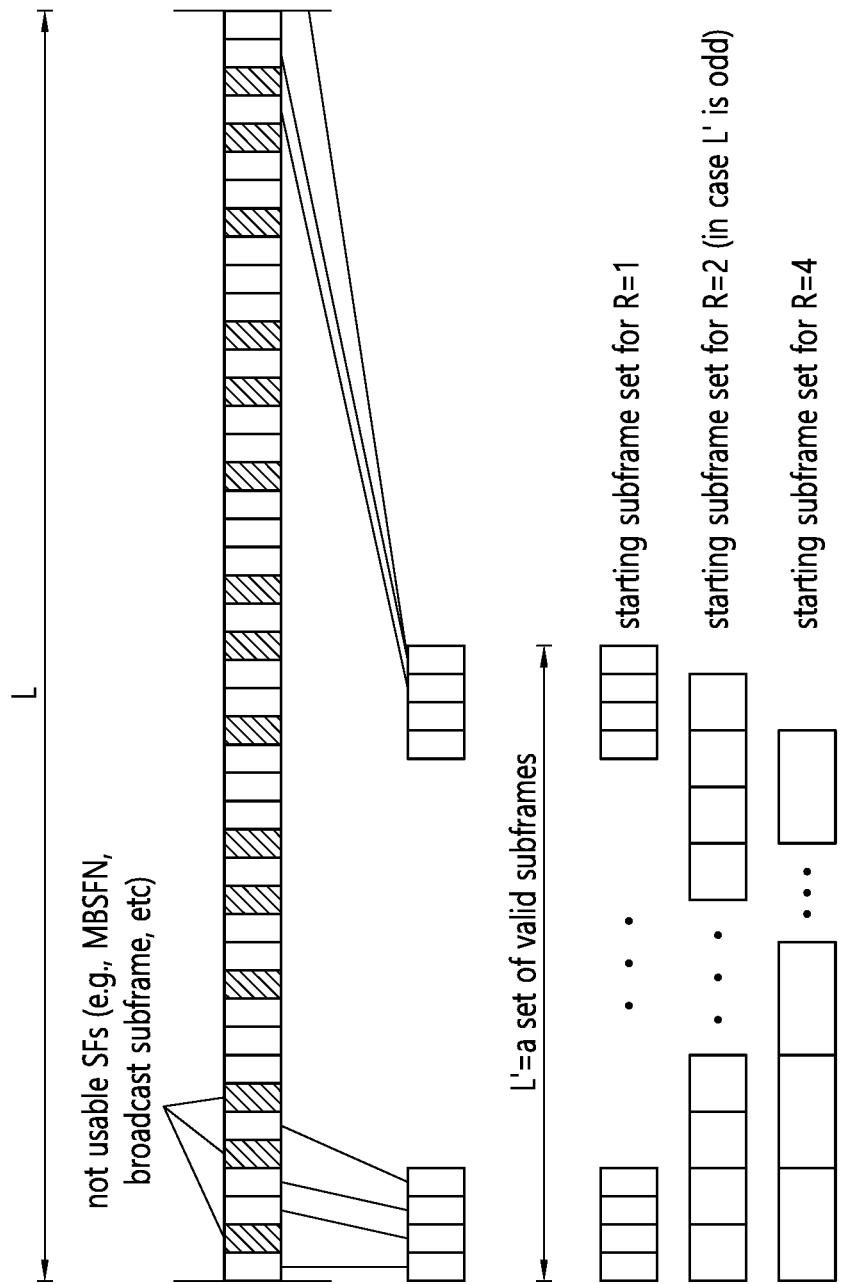
FIG. 12 shows an example of starting subframes in a frame structure for a MTC according to an embodiment of the present invention.

FIG. 12 shows an example of starting subframes in a frame structure for a MTC according to an embodiment of the present invention. Referring to FIG. 12, within L subframes, there is L' subframes (either DL or UL) which are valid subframes for MTC transmission. Among L' subframes, starting subframe sets for each repetition level (R) may be i*R, where i=0, 1 . . . L'/R−1. In this case, some subframes in each L' subframes may not be used for high repetition level. For example, referring to FIG. 12, the last some subframes within L' subframes may not be used for repetition level 2 and 4 in case that L' is odd.

(2) The network may configure the number of valid subframes (i.e. L') which can be divided by repetition level (R). For example, L' may be 16. In this case, then the repetition level of 32 occurs across two L durations. In this case as well, the starting subframe sets may be derived implicitly. If any repetition level R is larger than L', starting may start from SFN=0.

Figure 13:
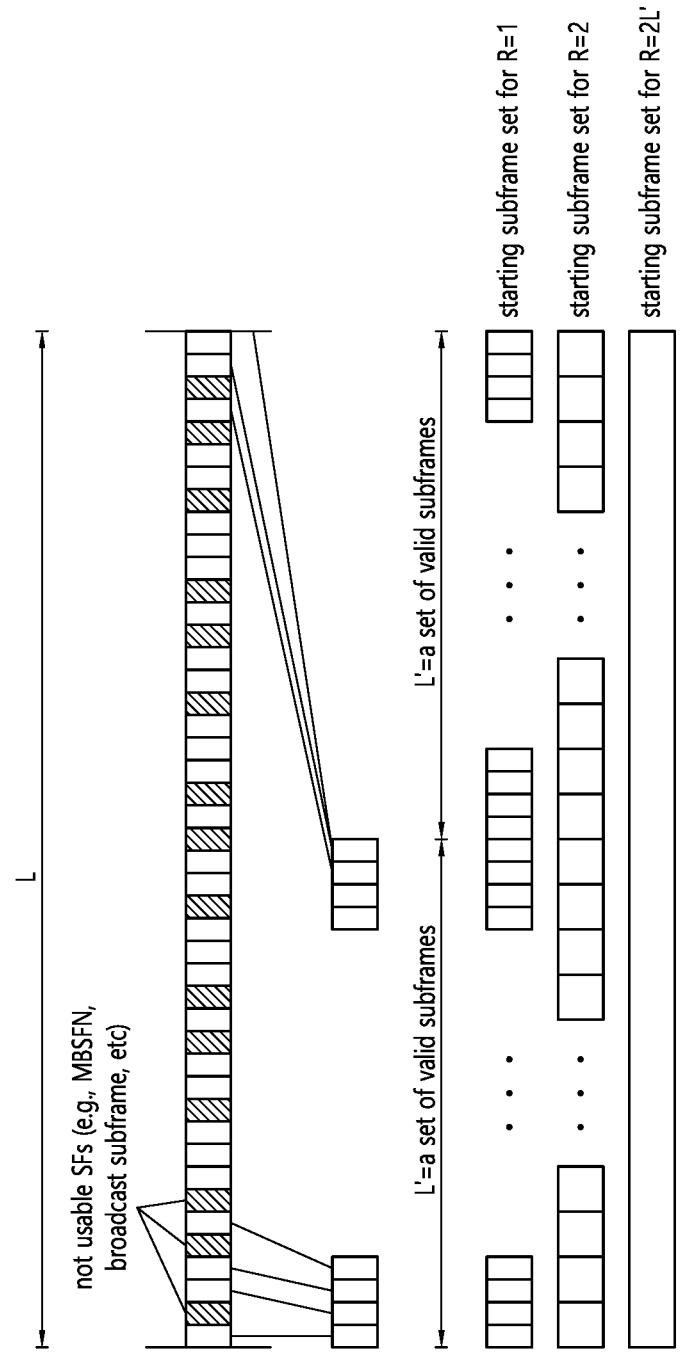
FIG. 13 shows another example of starting subframes in a frame structure for a MTC according to an embodiment of the present invention.

FIG. 13 shows another example of starting subframes in a frame structure for a MTC according to an embodiment of the present invention. Referring to FIG. 13, L' subframes may be configured so that the maximum repetition level R=2 L'. For example, L' may be 16 and the maximum repetition level may be 32. In this case, there is no subframe which is not used for high repetition level in each L' subframes.

(3) A cell common period may be configured. The options describe above may restrict the available subframes for data transmission. Therefore, it may be generally desirable that period P is configured which may be applied over legacy subframes (i.e. including unusable subframes) rather than over valid subframes. The period P may be a cell specific value. The period P may behave similar to L. For each repetition level, starting subframe sets may be defined implicitly within the period P, and then, the starting subframe sets may be reset in every period P. For example, L=40 and P=120 if L'=15 and the maximum R=32. In other words, to minimize the signaling overhead of L (bitmap indicating valid subframe sets) and maximize the availability, additional parameter indicating the period to reset the starting subframe sets may be configured. The period may be preconfigured as well, e.g. based on the maximum repetition number and the minimum available subframes.

Figure 14:
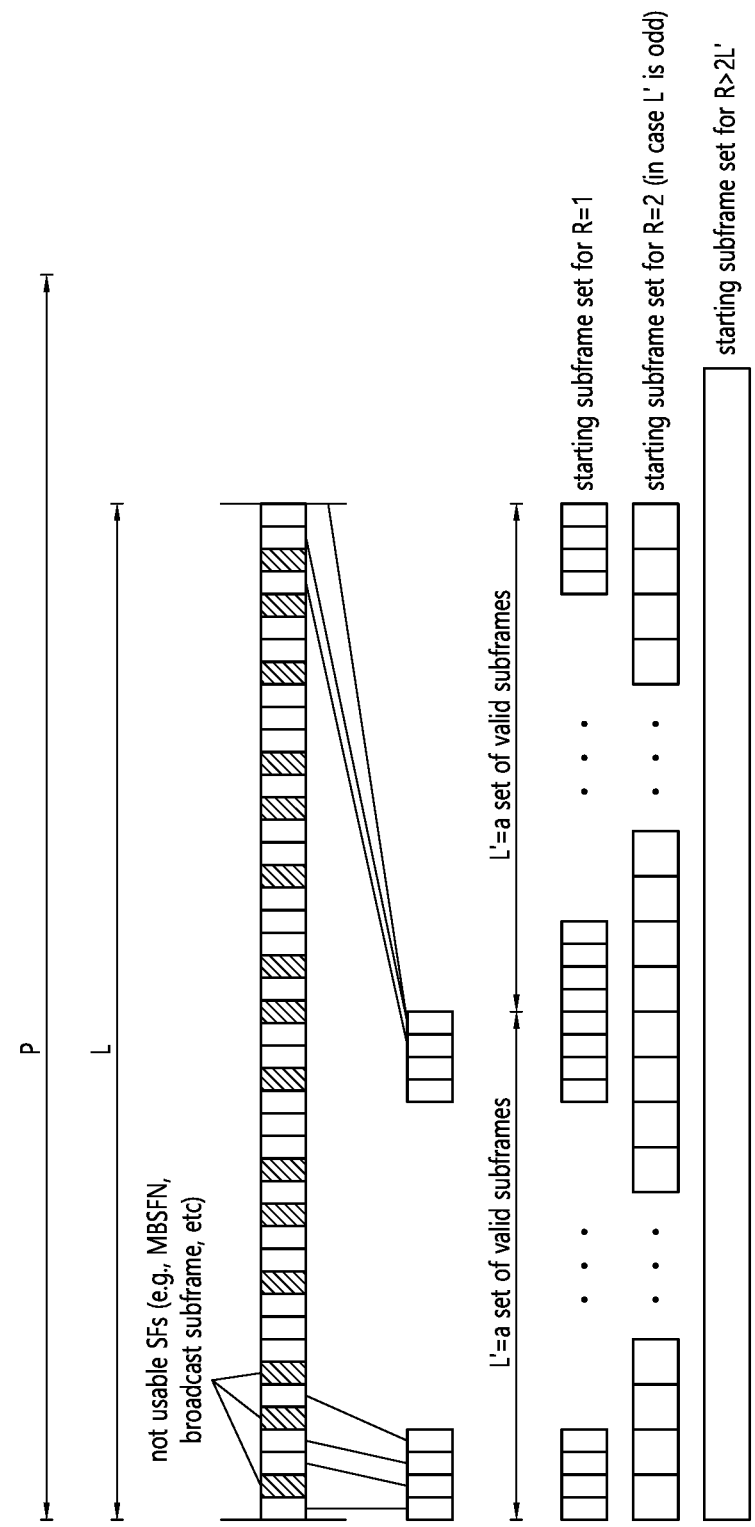
FIG. 14 shows another example of starting subframes in a frame structure for a MTC according to an embodiment of the present invention.

FIG. 14 shows another example of starting subframes in a frame structure for a MTC according to an embodiment of the present invention. Referring to FIG. 14, the period P, which may be longer than L, may be configured. The period P may be configured considering unusable subframe sets as well as valid subframe sets. That is, the period may be multiple of L. Within the period P, starting subframe sets may be defined implicitly for each repetition level. The starting subframe sets may be reset in every period P.

(4) UE-specific starting duration configuration (or per CE level or per repetition level) may be configured. In this case, the starting subframe sets may be applied based on legacy subframes (not based on valid subframes only). When UE-specific starting duration configuration is configured, starting subframe sets for each UE may be configured by TDM. If the number of valid subframes is less than the repetition level R in any monitoring instance, a UE may assume that there may be no control channel transmitted in that period. Alternatively, 2*R subframes may be always used for starting subframe sets. Or, K*R subframes may be always used for starting subframe sets, where K may be configurable (per cell or per CE level). This may have some benefit of UE multiplexing with UE battery saving particularly in large coverage case.

(5) Starting subframe may be determined based on the number of valid subframes starting from SFN=0 of subframe index=0. If there are remaining subframes within 1024 radio frames after repetition, the remaining subframes may not be used for MPDCCH repetition. In other words, in every 1024 radio frames, the starting subframe counting may start again (i.e. not cross over in the radio frame number wrap-around region). A UE may assume that the valid DL subframe sets may not be changed within 1024 radio frames.

(6) For option (5) described above, if ambiguity occurs with valid DL subframe update, it may last up to 1024 radio frames in the worst case. To minimize impact in the worst case, another implicit mechanism is that the closest radio frame number covering the maximum repetition level configured by the network or maximum repetition level configured to the specific narrowband is used to reset the starting subframe. For example, if a narrowband is configured with repetition number of 8, 16 and 32, it may take 32 as the maximum repetition level, and if there are 10 invalid subframes within 40 ms, the closest radio frame number to cover 32 repetition may be 5, then it may be assumed that the starting subframe sets of repetition level 8, 16, and 32 may be reset in every 5 radio frames. This option may be used along with option (5) to handle radio frame wrap-around issue. Though it is mentioned with existing configuration, the principle may be applied to other numbers of maximum radio frame in the system and/or the size of valid subframes indication for DL.

(7) A UE may assume that the valid DL subframes are not changed during the RRC-CONNECTED mode with option (5) described above.

Hereinafter, another frame structure for MTC transmission according to an embodiment of the present invention is described. Considering scheduling complexity and possible multiplexing among UEs, another approach for frame structure for MTC transmission is to map 6 PRBs (or 1 PRB) of each subframe to a virtual subband in the entire system bandwidth. For example, if system bandwidth can accommodate "H" subDLBW (each subDLBW may be 6 PRBs or 1 PRB, subDLBW may be a subband), a set of H subframes (either in consecutive or non-consecutive depending on the available subframes for MTC UE) may be a unit to transmit control channel and/or data channel. The set of H subframes may be called "I-TTI". I-TTI may consist of H consecutive or non-consecutive subframes. Based on I-TTI, depending on the repetitions used for control channel and/or data channel respectively, M-DCI region and MTC-PDSCH (M-PDSCH) region for a CE mode on a subDWBW may be defined.

Figure 15:
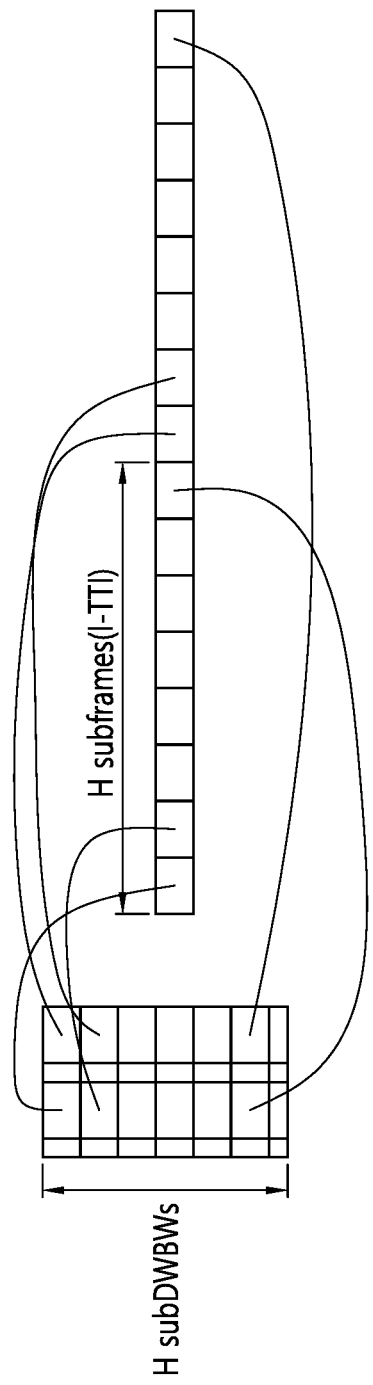
FIG. 15 shows an example of configuring I-TTI for MTC according to an embodiment of the present invention.

FIG. 15 shows an example of configuring I-TTI for MTC according to an embodiment of the present invention. Referring to FIG. 15, there are H subDLBWs (or H subbands) in the system bandwidth. H subbands in the first subframe may configure the first I-TTI, which consists of H subframes. And, H subbands in the second subframe may configure the second I-TTI, which also consists of H subframes. That is, each subbands in each subframe may be mapped to a virtual subband.

Figure 16:
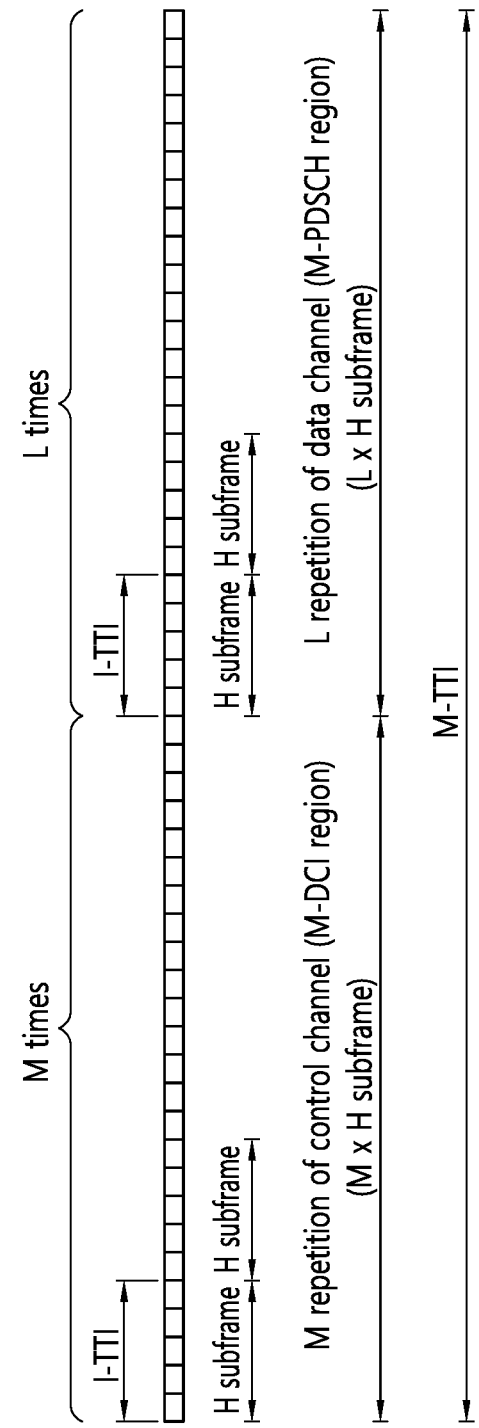
FIG. 16 shows another example of configuring I-TTI for MTC according to an embodiment of the present invention.

FIG. 16 shows another example of configuring I-TTI for MTC according to an embodiment of the present invention. FIG. 16 describes more detailed view of I-TTI described in FIG. 15. Referring to FIG. 16, I-TTI may consist of H subframes. H number of subframes may depend on the number of subbands in system bandwidth. M-DCI region may need M number of repetition of control channel, and accordingly, M-DCI region may consist of M*H subframes. Further, M-PDSCH region may need L number of repetition of data channel, and accordingly, M-PDSCH region may consist of L*H subframes.

From a UE perspective, a UE may be configured with a subDWBW where a UE monitors control channel and/or data channel. Also, the UE may be configured with a virtual subDLBW where control channel may be scheduled. For example, a UE may be configured with subDLBW index=3 (3rd subDLBW among H subDLBWs defined in a system bandwidth). In this case, the UE may monitor control channel and/or data channel according to 3rd subDLBW location which may change per subframe depending on hopping pattern and may be mapped to physical resource. Additionally, a UE may be configured with PRBs or subDLBW index used for control channel, e.g., subDLBW index=5. Assuming M repetitions are needed in one subband for a given CE level, the UE may assume that control channel may be scheduled in [starting subframe index+ (subDLBW index−1)*M, starting subframe index+ subDWBWindex*M]. In other words, control channel from the lowest subDWBW may be scheduled first in time. In other words, a UE may be configured with possible locations in subframes within M-DCI region.

The location or starting subframe of scheduled PDSCH may be indicated by DCI with subDWBW index. Repetition of PDSCH may occur in a similar fashion to control channel Another approach is to connect the starting subframe to enhanced CCE (ECCE) index used for control channel or a scrambling sequence used for control channel. In summary, the starting subframe location may be changed based on control signaling or semi-statically configured (e.g. control/data channel subDWBW may be configured independently or jointly by higher layer signaling). When determining subDLBW for control channel and/or data channel, instead of relying on higher layer signaling, implicit mechanism such as depending on UE ID may also be considered. A hashing function may also be used which generates different starting subframe index based on UE RNTI and/or subframe index and/or SFN and/or some other indexing.

Meanwhile, system bandwidth of 200 kHz may be configured. IN this case, in order to allow flexible resource allocation, a subcarrier(s) may be mapped to one PRB. For example, 1 subcarrier may be mapped to one PRB. If this is applied, the length of TTI size may be 12 times longer than that of the conventional TTI (i.e. 12 ms). When a UE is configured with 6 PRBs, the UE may be mapped to 6 subcarriers over 12 ms. However, this requires a slight change in terms of DM-RS mapping, since not every subcarrier in DL has a DM-RS. For one approach, a cell common DM-RS pattern in 200 kHz system bandwidth may be used. In this case, the UE may use any DM-RS from different subcarriers which may not be allocated to the UE. Or, similar to UL DM-RS, DM-RS over the entire subcarriers may also be considered. For another approach, DM-RS may be mapped to subframe corresponding to subcarrier carrying DM-RS. Since the data may be far from DM-RS in time-domain, this approach may work only when time-variance is very small. Though if this is used, the mapping of enhanced PDCCH (EPDCCH) and data may be reused and simply expanded over time domain. Otherwise, a new mapping may be necessary.

Also, hopping of subDLBW for control channel and/or data channel may be considered, which may result in changing of starting subframe for control channel and/or data channel repetition within M-TTI.

If buffering is acceptable, control/data may be scheduled similar to the legacy system where the actual mapping may occurred over multiple subframes instead of single TTI. For example, if a UE may buffer/process I-TTI subframes, the network may schedule control channel in any PRB(s) belonging to set of subDLBWs where the control channel may be mapped to multiple subframes. The UE may decode control channel by accessing the configured set of PRBs over multiple subframes. This may increase the power consumption as the UE may have to read many subframes to decode one control channel. However, it may improve the network flexibility and reduce scheduling complexity. Similar to control channel, resource for data channel may also be mapped to the PRB(s) belonging to the set of subDLBWs where the UE may require reading PRBs scheduled by the DCI over multiple subframes (and thus possibly increase the latency and power consumption). To be able to access all PRBs allowed by the system bandwidth, the set of subDLBWs may be configured to cover all PRBs. The last subDLBW or the first subDLBW or the first/last subDLBW may consist of less than 6 PRBs.

When the network needs to schedule more than 6 PRBs, the network may schedule more than 6 PRBs via resource allocation. Since the allocated PRBs spans more than one subDLBW, a UE may have to read more than one repetition of PDSCHs (i.e. more than L subframes) to decode data. In terms of determining H subframes, it may be determined based on system bandwidth implicitly or it may be configured by the network via MIB, or SIB or via RAR.

Figure 17:
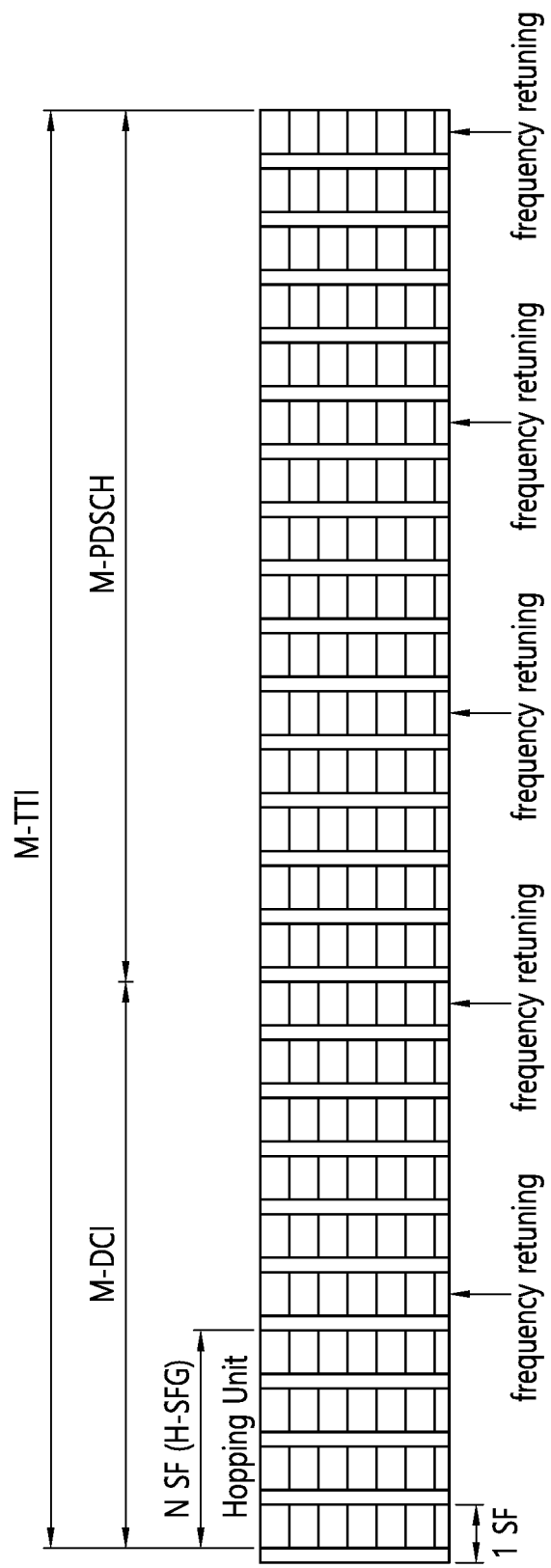
FIG. 17 shows an example of a frame structure used for MTC according to an embodiment of the present invention.

FIG. 17 shows an example of a frame structure used for MTC according to an embodiment of the present invention. Referring to FIG. 17, M-TTI may consist of M-DCI region and M-PDSCH region. That is, M-TTI may be the sum of M-DCI region and the M-PDSCH region. M-DCI region may need M number of repetition for control channel, and accordingly, M-DCI region may consist of M*N subframes, where N subframes corresponds to FH-SFG which is repetition unit. M*N subframes may count only available subframes. Likewise, M-PDSCH region may need L number of repetition for control channel, and accordingly, M-DCI region may consist of L*N subframes. L*N subframes may count only available subframes.

Figure 18:
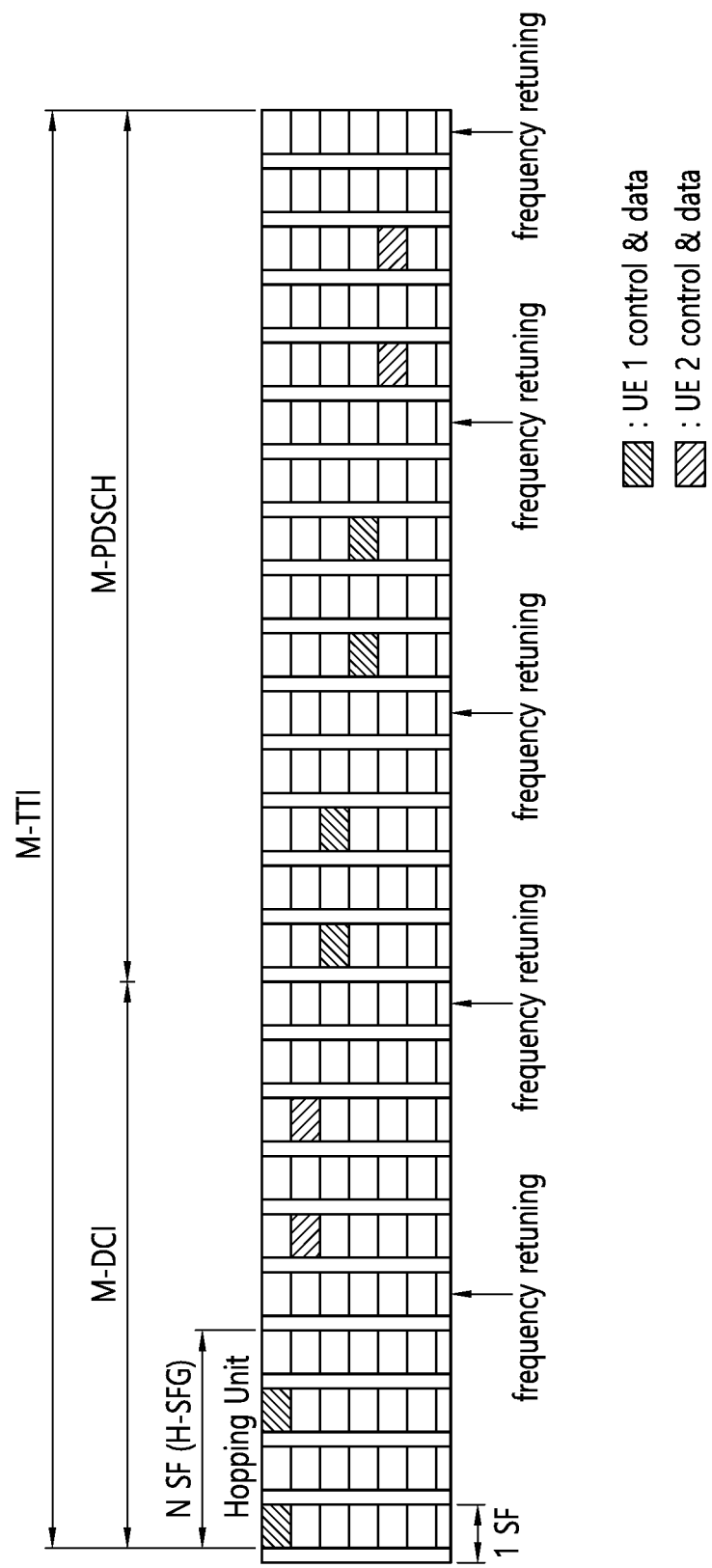
FIG. 18 shows an example of data transmission for MTC according to an embodiment of the present invention.

FIG. 18 shows an example of data transmission for MTC according to an embodiment of the present invention. FIG. 18 corresponds to data transmission for MTC UE by using the frame structure used for MTC described in FIG. 17. In the first FH-SFG, control channel for MTC UE 1 may be transmitted. In the second FH-SFG, control channel for MTC UE 2 may be transmitted. In the third/fourth FH-SFG, data channel for MTC UE 1 may be transmitted. In the fifth FH-SFG, data channel for MTC UE 2 may be transmitted.

Hereinafter, frequency hopping mechanism to minimize effects of frequency retuning latency according to an embodiment of the present invention is described. Due to limited hardware capability, frequency retuning latency for MTC UE may be larger than 200 us. It is expected that one slot or one subframe may be reserved for frequency retuning latency. Thus, one slot/subframe may not be used for data repetition for MTC UE. This may result in high overhead/low spectral efficiency from unused slots/subframes for MTC UEs. Particularly, if there are only MTC UEs in the system, those slots/subframes may not be used at all. To minimize the impact of frequency retuning latency, at least one of the following options may be considered in the present invention.

(1) Option 1: Two or more UEs may be shared/interlaced in one subband to minimize not-schedulable subframes. That is, two UEs may be interlaced within one FH-SFG, and one UE utilizes the first subframe (or first slot) as a guard/frequency retuning subframe (slot) and the other UE utilizes the last subframe as a guard/frequency retuning subframe (or slot).

Figure 19:
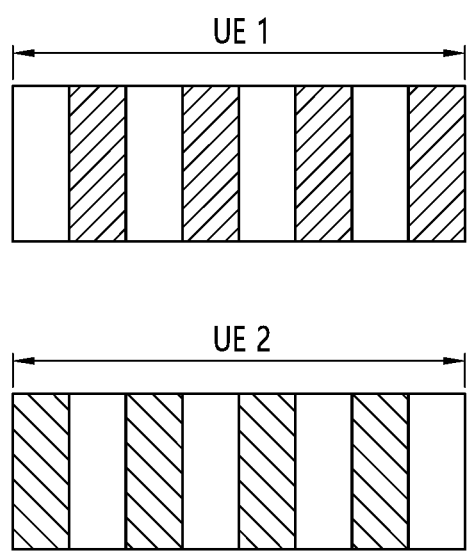
FIG. 19 shows an example of interlacing two UEs for MTC according to an embodiment of the present invention.

FIG. 19 shows an example of interlacing two UEs for MTC according to an embodiment of the present invention. Referring to FIG. 19, if FH-SFG consists of 8 subframes, two UEs may be multiplexed, and each UE may be scheduled with up to 4 subframes in a FH-SFG. UE 1 may be scheduled in 2/4/6/8th subframes, and UE 2 may be scheduled 1/3/5/7th subframes. Frequency retuning latency for UE 1 may be placed in 1st subframe, and frequency retuning latency for UE 2 may be placed in 8th subframe (i.e. last subframe).

(1) Option 2: Two or more UEs may be multiplexed in one subband. More specifically, two or more UEs may share one subband, and frequency retuning latency/subframe may be placed after scheduling. Different UEs may be configured with different starting of transmission in a FH-SFG such that other UE may be scheduled in frequency retuning subframe of another UE. That is, each UE may utilize consecutive subframes (among valid DL (V-DL) subframes or valid UL (V-UL) subframes) where frequency retuning gap may be placed at the end of transmission and the transmission may start in different time.

Figure 20:
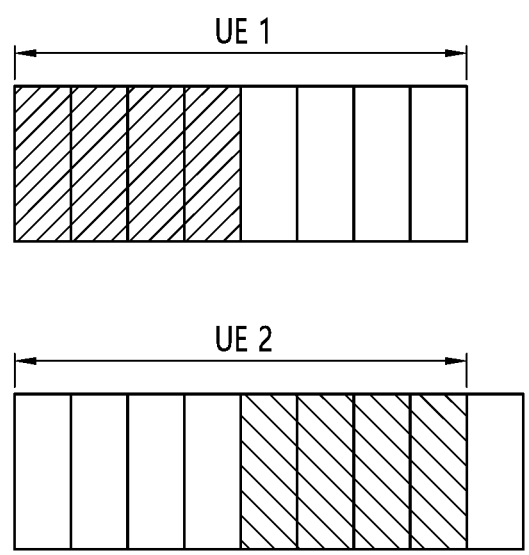
FIG. 20 shows an example of multiplexing two UEs for MTC according to an embodiment of the present invention.

FIG. 20 shows an example of multiplexing two UEs for MTC according to an embodiment of the present invention. Referring to FIG. 20, UE 1 may be scheduled in 1st to 4th subframes, and frequency retuning latency for UE 1 may be placed in 5th subframe. UE 2 may be scheduled in 5th to 8th subframes, and frequency retuning latency for UE 2 may be placed in 1st subframe.

(3) Option 3: Two or more UEs may be multiplexed in different subbands. If subband hopping occurs in two subbands, UEs scheduled in each subband may take different frequency hopping gap subframe.

Figure 21:
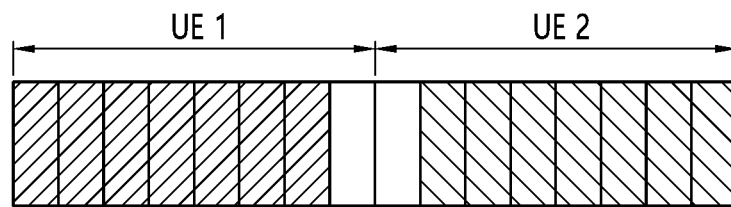
FIG. 21 shows another example of multiplexing two UEs for MTC according to an embodiment of the present invention.
Figure 21:
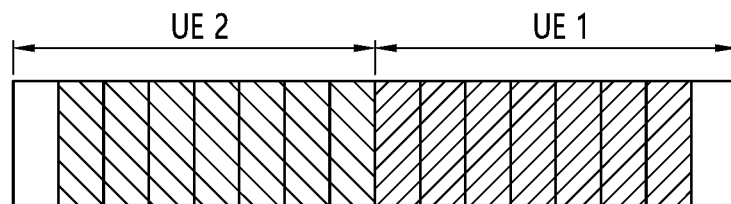

FIG. 21 shows another example of multiplexing two UEs for MTC according to an embodiment of the present invention. Referring to FIG. 21, subband1 starting UE (i.e. UE 1) may take the last subframe as a gap, and subband 2 starting UE (i.e. UE 2) may take the first subframe as a gap. If this is used, gap subframe may be usable at least for one UE group. In other words, UEs allocated with the same subband may take the same frequency retuning gap (either the first or last in a FH-SFG).

For options described above, whether this type of operation is used or not and which option is used may be configured by higher layer. Once the UE knows which option is used, the UE may apply the transmission subframe based on its UE-ID or C-RNTI. The same mechanism may also be applied for data transmission as well. If multiple HARQ processes are used, combining option 1 and option 2 may also be considered. When multiple subbands are used for frequency hopping, the gap location may be determined by the subband index. For example, even subbands may use the first subframe (slot) as a gap, and odd subbands may use the last subframe (slot) as a gap. In this case, two different data may be scheduled/transmitted with different HARQ process IDs belonging to each UE where each UE may be multiplexed by TDM.

Figure 22:
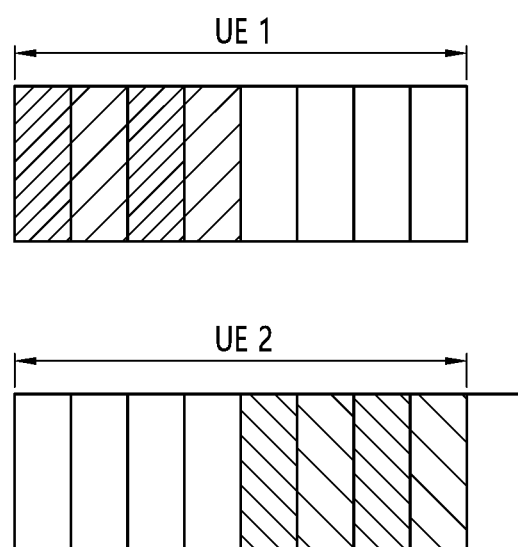
FIG. 22 shows another example of multiplexing two UEs for MTC according to an embodiment of the present invention.

FIG. 22 shows another example of multiplexing two UEs for MTC according to an embodiment of the present invention. Referring to FIG. 22, as similar as FIG. 20, UE 1 may be scheduled in 1st to 4th subframes, and frequency retuning latency for UE 1 may be placed in 5th subframe. However, two different data may be scheduled with different HARQ processes in 1st to 4th subframes. UE 2 may be scheduled in 5th to 8th subframes, and frequency retuning latency for UE 2 may be placed in 1st subframe. However, two different data may be scheduled with different HARQ processes in 5th to 8th subframes.

Hereinafter, subband sharing between UEs with different CE level according to an embodiment of the present invention is described. Though subband may be configured by SIB or higher layer signaling, it may be assumed that a UE knows the formation of a set of subbands used for MTC transmission. Let's assume that subband index [0 . . . K−1] may be used for MTC transmission. In terms of defining the size of FH-SFG, the one of the following approaches may be considered.

(1) FH-SFG may have the same size across all subbands regardless of CE level supported by each subband. In this case, the size of FH-SFG may be configured by MIB or SIB which is used across all subbands.

(2) FH-SFG may have different size per each subband. In this case, a UE may be able to hop on different subband with the same FH-SFG size. For example, if subband 1 has FH-SFG with size 5 and subband 2 has FH-SFG with size 6, a UE assigned to subband 1 may not be able to hop on subband 2. In other words, a UE may expect hopping on only subbands with the same FH-SFG size. If FH-SFG size of a subband is a multiple of size of FH-SFG of another subband, those two subbands may be paired as a hopping subband pair where the maximum value may be used. Alternatively, the maximum size of FH-SFG among paired hopping subbands is used if hopping is enabled and two subbands are paired as a hopping subband pair.

Since UEs with different CE levels may be allocated with different M-TTI size, similar to FH-SFG size, if UEs are allocated to a subband, the size used in that subband may follow the size of M-TTI configured for that specific subband regardless of CE level. In other words, a UE may be configured to a subband which supports higher CE level or lower CE level that the UE supports. The size of M-TTI, M-DCI, M-PDSCH per subband may be configured independently from CE level configured to a UE. The size of frame structure may be configured via SIB, whereas CE level configured to a specific UE may be configured via RRC signaling or via RAR. In other words, via MIB or SIB or RAR, the list of subbands and the size of M-TTI/M-DCI/M-PDSCH may be configured. To minimize signaling overhead, a set of prefixed combinations of sizes of M-TTI/M-DCI may also be considered. Furthermore, a set of valid DL and/or UL subframes may be configured per subband via MIB or SIB or RAR. In case there is no configuration is given, a default configuration may be assumed. For example, when valid DL subframes only contain non-MBSFN subframes and valid UL subframes contain all UL subframes, size of M-TTI may be 100 subframes and size of M-DCI may be 20 subframes (2 radio frames) counting all valid or non-valid DL or UL subframes.

If a UE requires more repetition than a default M-TTI supports (and thus, possibly PDSCH repetition of current transmission and control channel for next transmission may overlap), it is up to UE implementation whether to monitor control channel. In case PDSCH repetition of current transmission and PDSCH reception of next transmission may overlap, UE may not be required to monitor both. In that case, the first PDSCH may be monitored. Based on a default M-TTI, a UE may be configured with a set of starting subframes for control channel as well. For example, in every K M-TTI, a UE may be expected to start monitoring on control channel repetition.

In summary, to allow UEs with different CE levels in a subband, size of M-TTI may be configured by either maximum or minimum or some small number usable for UEs, and each UE may be configured with independent starting subframe sets for control channel or data channel based on M-TTI structure.

Figure 23:
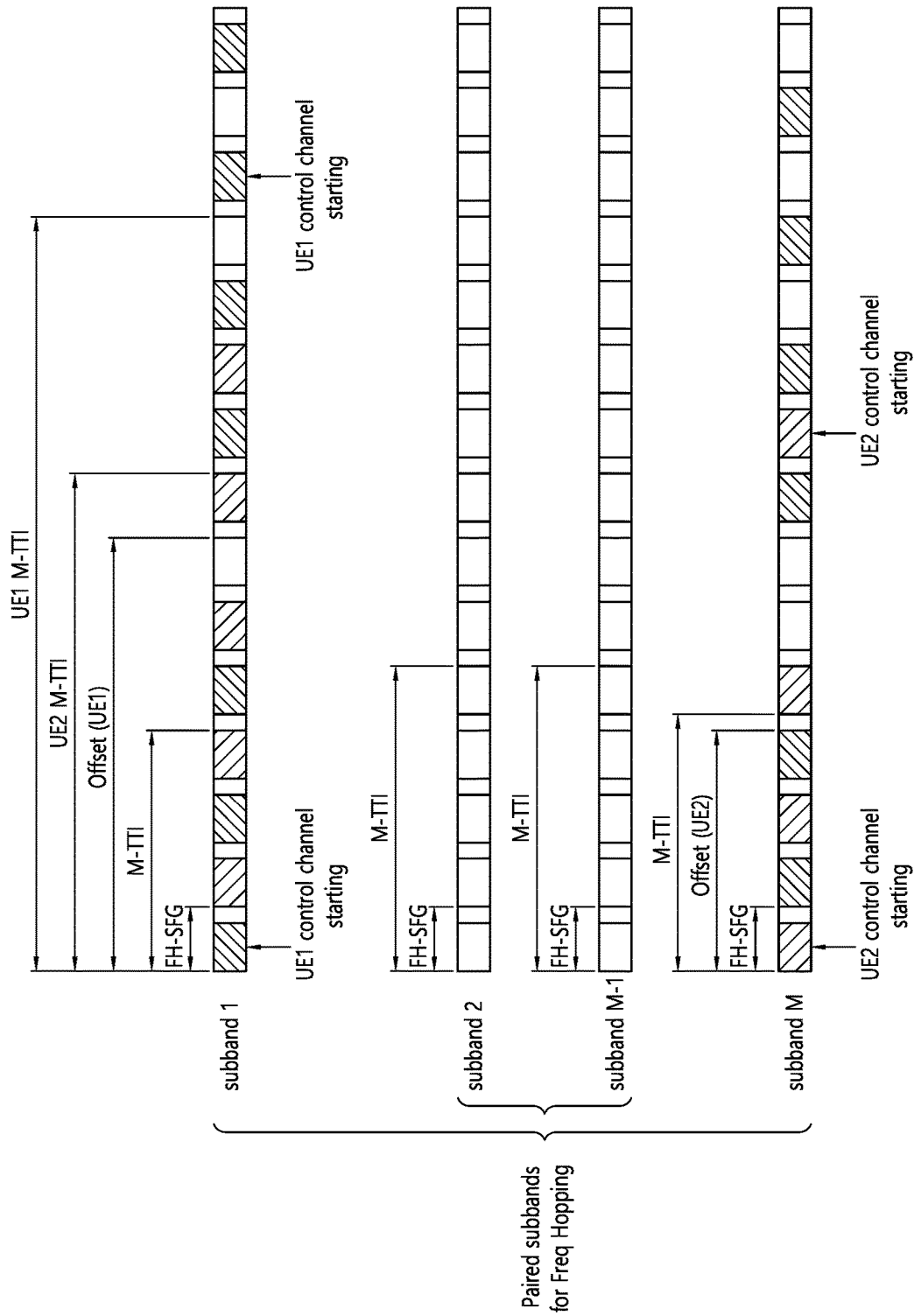
FIG. 23 shows an example of data transmission for MTC according to an embodiment of the present invention.

FIG. 23 shows an example of data transmission for MTC according to an embodiment of the present invention. FIG. 23 corresponds to a case that two UEs with different CE levels, i.e. UE 1 and UE 2, share a subband. Referring to FIG. 23, it is assumed that M-TTI of UE 1 is 3*M-TTI, and M-TTI of UE 2 is 2*M-TTI. That is, M-TTI may be configured differently per subband where each UE may be configured with different starting subframe set for control channel repetition. UE 1 may be configured with control channel starting every 3*M-TTI (thus, UE 1 expects to receive control channel in every 3*M-TTI). UE 2 may be configured with control channel starting every 2*M-TTI (thus, UE 2 expects to receive control channel in every 2*M-TTI). Further, it is assumed that M-DCI of UE 1 is 5*FH-SFG, M-PDSCH of UE 1 is 7*FH-SFG, and offset of UE 1 is 9*FH-SFG. It is assumed that M-DCI of UE 2 is 4*FH-SFG, M-PDSCH of UE 2 is 4*FH-SFG, and offset of UE 2 is 4*FH-SFG. The starting PDSCH position may be configured by period and offset. For example, periodicity of PDSCH transmission is 3*M-TTI for UE 1 with offset of 9*FH-SFG.

A UE may expect that at most one unicast PDSCH may be transmitted with that offset with periodicity. This offset may be considered as maximum duration used for control channel. In other words, actual subframes used for PDSCH repetition may be configured/indicated by control channel dynamically. The starting of subframes usable for PDSCH (i.e. M-PDSCH) starts from the offset against the starting of control channel in each TTI unit (for UE 1, 3*M-TTI is the unit of TTI).

Figure 24:
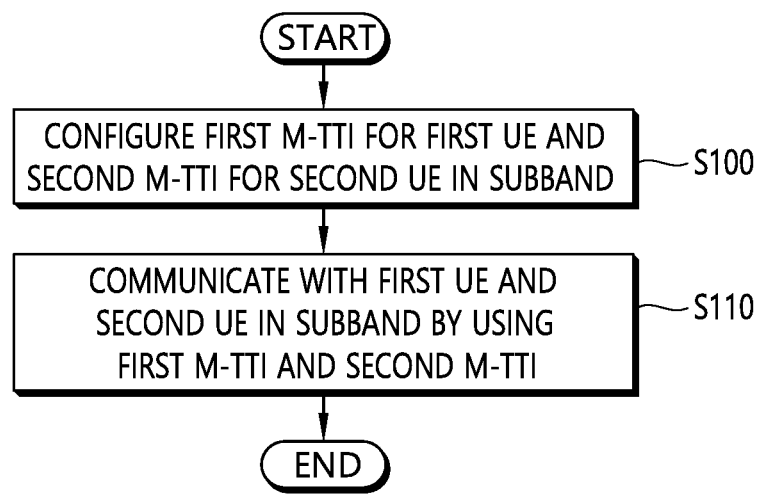
FIG. 24 shows a method for communicating, by a BS, with a MTC UE according to an embodiment of the present invention.

FIG. 24 shows a method for communicating, by a BS, with a MTC UE according to an embodiment of the present invention.

In step S100, the BS configures a first M-TTI for a first UE and a second M-TTI for a second UE in a subband. The first UE and the second UE have different CE level from each other. A size of the first M-TTI and a size of the second M-TTI may be different from each other. A size of the first M-TTI and a size of the second M-TTI may be configured regardless of the CE level of the first UE and the second UE. A size of the first M-TTI and a size of the second M-TTI may be configured via SIB.

Further, the CE level of the first UE and the CE level of the second UE may be configured via RRC signaling or RAR. A set of valid UL subframes for MTC transmission may be configured in the subband. The set of valid UL subframes for MTC transmission may be configured via one of MIB, SIB or RAR. Starting subframes sets for a control channel and a data channel may be configured in the first M-TTI and the second M-TTI.

In step S110, the BS communicates with the first UE and the second UE in the subband by using the first M-TTI and the second M-TTI.

Figure 25:
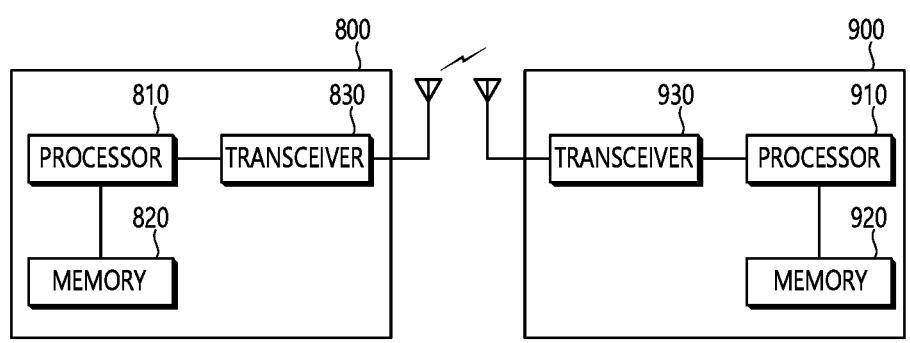
FIG. 25 shows a wireless communication system to implement an embodiment of the present invention.

FIG. 25 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for receiving a downlink (DL) channel by a user equipment (UE) in a wireless communication system, the method comprising:
receiving, by the UE, a parameter related to a frequency hopping interval via system information,
wherein the parameter related to the frequency hopping interval is a cell-specific parameter,
wherein the parameter indicates N number of subframes for the frequency hopping interval, and
wherein the parameter related to the frequency hopping interval is configured per coverage enhancement (CE) level of the UE; and
receiving, by the UE, the DL channel based on the parameter related to the frequency hopping interval.

2. The method of claim 1, wherein the parameter related to the frequency hopping interval is also received via a higher layer signaling.

3. The method of claim 1, wherein the frequency hopping interval is configured separately for DL and an uplink (UL), respectively.

4. The method of claim 1, wherein the N number of subframes are consecutive absolute subframes over the downlink channel for the configured CE level of the UE.

5. The method of claim 1, wherein the DL channel is a DL data channel, and wherein the DL data channel carries at least one physical downlink shared channel (PDSCH).

6. The method of claim 1, wherein the DL channel is a DL control channel, and wherein the DL control channel carries at least one MTC physical downlink control channel (MPDCCH).

7. A user equipment (UE) in a wireless communication system, the UE comprising:
a memory;
a transceiver; and
a processor, operatively coupled to the memory and the transceiver, that:
controls the transceiver to receive a parameter related to a frequency hopping interval via system information,
wherein the parameter related to the frequency hopping interval is a cell-specific parameter,
wherein the parameter indicates N number of subframes for the frequency hopping interval, and
wherein the parameter related to the frequency hopping interval is configured per coverage enhancement (CE) level of the UE; and
controls the transceiver to receive a downlink (DL) channel based on the parameter related to the frequency hopping interval.

8. The UE of claim 7, wherein the parameter related to the frequency hopping interval is also received via a higher layer signaling.

9. The UE of claim 7, wherein the frequency hopping interval is configured separately for DL and an uplink (UL), respectively.

10. The UE of claim 7, wherein the N number of subframes are consecutive absolute subframes over the downlink channel for the configured CE level of the UE.

11. The UE of claim 7, wherein the DL channel is a DL data channel, and wherein the DL data channel carries at least one physical downlink shared channel (PDSCH).

12. The UE of claim 7, wherein the DL channel is a DL control channel, and wherein the DL control channel carries at least one MTC physical downlink control channel (MPDCCH).

\* \* \* \* \*